(12) United States Patent
Gutowski et al.

(10) Patent No.: US 10,865,698 B1
(45) Date of Patent: Dec. 15, 2020

(54) METHOD TO REDUCE ENGINE COOLANT TEMPERATURE BASED ON CLIMATE FAN SPEED

(71) Applicant: Ford Global Technologies, LLC, Dearborn, MI (US)

(72) Inventors: Alan Gutowski, Wixom, MI (US); Manfred Koberstein, Troy, MI (US); Curtis Mark Jones, Wixom, MI (US); James C. Rollinson, Superior Township, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/708,757

(22) Filed: Dec. 10, 2019

(51) Int. Cl.
*F01P 11/16* (2006.01)
*F01P 3/22* (2006.01)
*F01P 9/04* (2006.01)
*F01P 5/02* (2006.01)

(52) U.S. Cl.
CPC ............... *F01P 11/16* (2013.01); *F01P 3/22* (2013.01); *F01P 5/02* (2013.01); *F01P 9/04* (2013.01)

(58) Field of Classification Search
CPC ...... F01P 11/16; F01P 3/22; F01P 5/02; F01P 9/04
See application file for complete search history.

(56) References Cited

U.S. PATENT DOCUMENTS

| 1,426,900 | A | * | 8/1922 | Neal | .................. 126/110 R |
| 4,510,764 | A | | 4/1985 | Suzuki | |
| 5,730,103 | A | | 3/1998 | Takizawa et al. | |
| 7,174,733 | B2 | | 2/2007 | Oomura et al. | |

FOREIGN PATENT DOCUMENTS

| JP | 08218929 A | 8/1996 | | |
| KR | 20080007715 A | 1/2008 | | |
| WO | WO-2016185243 A1 | * | 11/2016 | ............. F25B 40/00 |
| WO | WO-2017138258 A1 | * | 8/2017 | ........... B60H 1/0073 |

* cited by examiner

*Primary Examiner* — Jacob M Amick
*Assistant Examiner* — Charles Brauch
(74) *Attorney, Agent, or Firm* — David Coppiellie; Price Heneveld LLP

(57) ABSTRACT

A vehicle includes an engine cooling system. The engine cooling system includes an engine. A radiator is fluidly coupled to the engine. A sensor is configured to provide a temperature reading of a coolant at the engine. The vehicle further includes a heat pump system. The heat pump system includes a condenser disposed proximate the radiator and fluidly coupled to the compressor. An evaporator is fluidly coupled to the condenser. A climate fan is fluidly coupled to an exterior surface of the evaporator. A climate control module is configured to control a speed of the climate fan. The climate control module establishes a maximum speed of the climate fan in response to a temperature reading from the sensor.

17 Claims, 3 Drawing Sheets

METHOD TO REDUCE ENGINE COOLANT TEMPERATURE BASED ON CLIMATE FAN SPEED

FIELD OF THE DISCLOSURE

The present disclosure generally relates to an engine overheat protection strategy for a vehicle.

BACKGROUND OF THE DISCLOSURE

A vehicle typically includes one or more powertrain components which produce substantial heat during operation of the vehicle. Vehicles typically include a cooling system for managing the heat produced by the powertrain components. The cooling system typically includes a low-temperature radiator located at a front end of the vehicle to be cooled by ambient air as the vehicle travels in a forward direction.

Vehicles often include a heating, ventilation, and air conditioning (HVAC) system for providing conditioned air to a passenger compartment of the vehicle. The HVAC system typically includes a condenser located at the front end of the vehicle upstream from the low-temperature radiator. The ambient air is heated as it travels through the condenser. The heated ambient air then travels through the low-temperature radiator to exchange heat with the cooling system. Accordingly, the heating of the ambient air by the condenser can negatively impact the performance of the cooling system.

SUMMARY OF THE DISCLOSURE

According to one aspect of the present disclosure, a vehicle includes an engine cooling system. The engine cooling system includes an engine, a radiator fluidly coupled to the engine, and a sensor configured to provide a temperature reading of a coolant at the engine. The vehicle further includes a heat pump system, which includes a condenser disposed proximate the radiator and fluidly coupled to the compressor. An evaporator is fluidly coupled to the condenser. A climate fan is fluidly coupled to an exterior surface of the evaporator. A climate control module is configured to control a speed of the climate fan. The climate control module establishes a maximum speed of the climate fan in response to a temperature reading from the sensor.

Embodiments of the first aspect of the present disclosure can include any one or a combination of the following features:
the maximum speed of the climate fan speed is reduced in response to the temperature reading exceeding an overheat temperature;
the maximum climate fan speed is reduced linearly, as a function of the temperature reading, as the temperature reading exceeds the overheat temperature;
the overheat temperature is about 100 degrees Celsius to about 120 degrees Celsius;
a reduction to the maximum speed of the climate fan is capped in response to the temperature reading exceeding an upper-limit temperature;
the upper-limit temperature is about 113 degrees Celsius to about 133 degrees Celsius;
the climate control module disables the climate fan in response to the temperature reading exceeding a cut-off temperature; and
the cut-off temperature is about 120 degrees Celsius to about 140 degrees Celsius.

According to another aspect of the present disclosure, a method for reducing engine coolant temperature includes providing a vehicle including an engine coolant temperature sensor, a climate control module, and a climate fan. The method further includes receiving a temperature reading from the engine coolant temperature sensor by the climate control module. The method also includes establishing a maximum speed for the climate fan by the climate control module based on the received temperature reading.

Embodiments of the second aspect of the present disclosure can include any one or a combination of the following features:
the maximum speed of the climate fan speed is reduced in response to the temperature reading exceeding an overheat temperature;
the maximum climate fan speed is reduced linearly as a function of the received temperature reading as the temperature reading exceeds the overheat temperature;
the overheat temperature is about 100 degrees Celsius to about 120 degrees Celsius;
the reduction to the maximum speed of the climate fan is capped in response to the temperature reading exceeding an upper-limit temperature;
the upper-limit temperature is about 113 degrees Celsius to about 133 degrees Celsius;
the climate control module disables the climate fan in response to the temperature reading exceeding a cut-off temperature; and
the cut-off temperature is about 120 degrees Celsius to about 140 degrees Celsius.

According to a third aspect of the present disclosure, a vehicle includes a cooling system including a coolant temperature sensor. The vehicle further includes an HVAC system comprising a climate fan. The vehicle further includes a controller electrically coupled to the coolant temperature sensor and the climate fan. The controller establishes a maximum speed of the climate fan in response to a temperature reading received from the coolant temperature sensor.

Embodiments of the third aspect of the present disclosure can include any one or a combination of the following features:
the maximum speed of the climate fan speed is reduced in response to the temperature reading exceeding an overheat temperature;
a compressor for circulating a refrigerant through a heat pump system, wherein function of the compressor is maintained when the temperature reading exceeds the overheat temperature; and
the climate fan and the compressor are disabled in response to the temperature reading exceeding a cut-off temperature wherein the cut-off temperature is greater than the overheat temperature.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
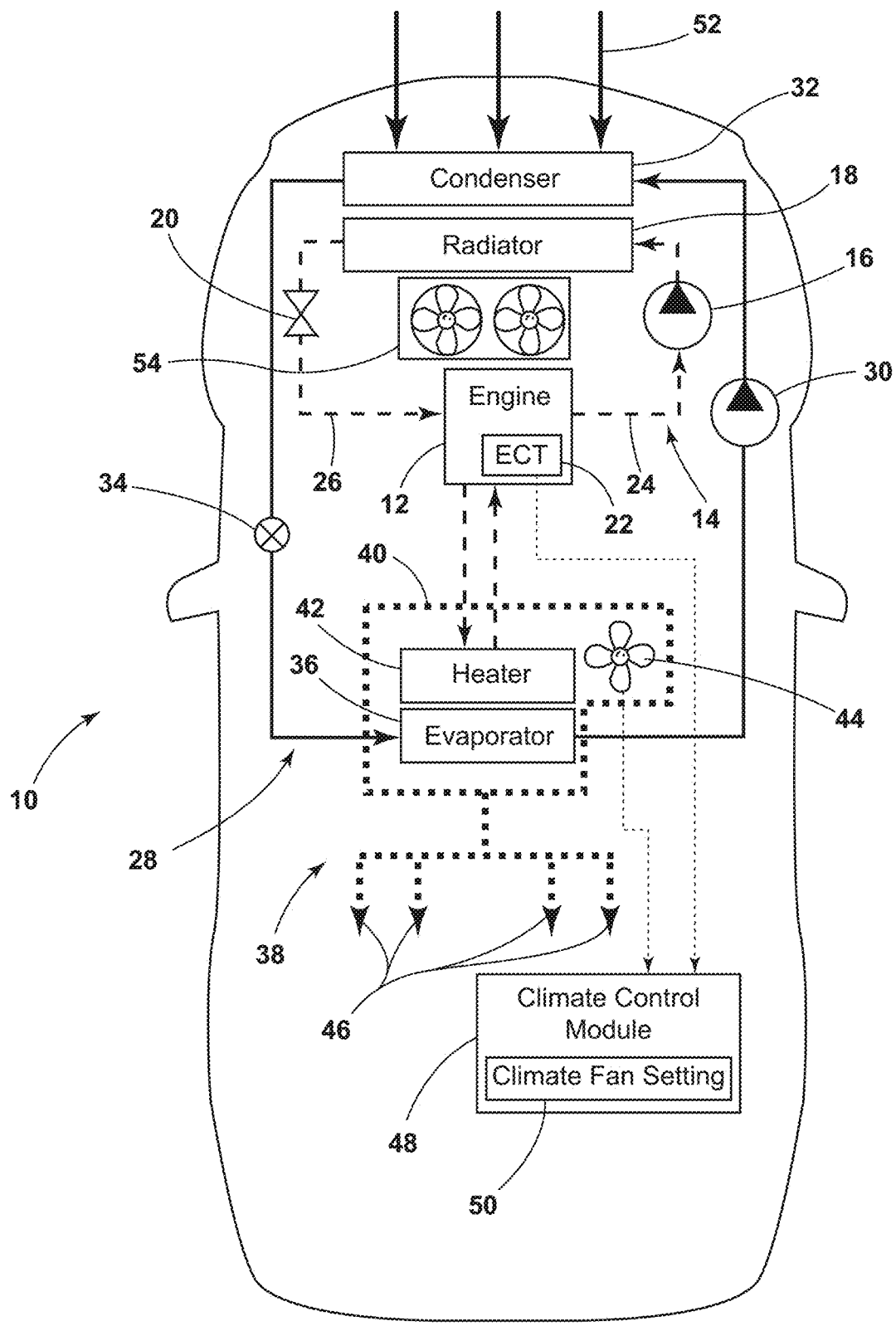
FIG. 1 is a schematic view of a vehicle having a cooling system, a heat pump system, and an HVAC system according to one embodiment of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Figure 2:
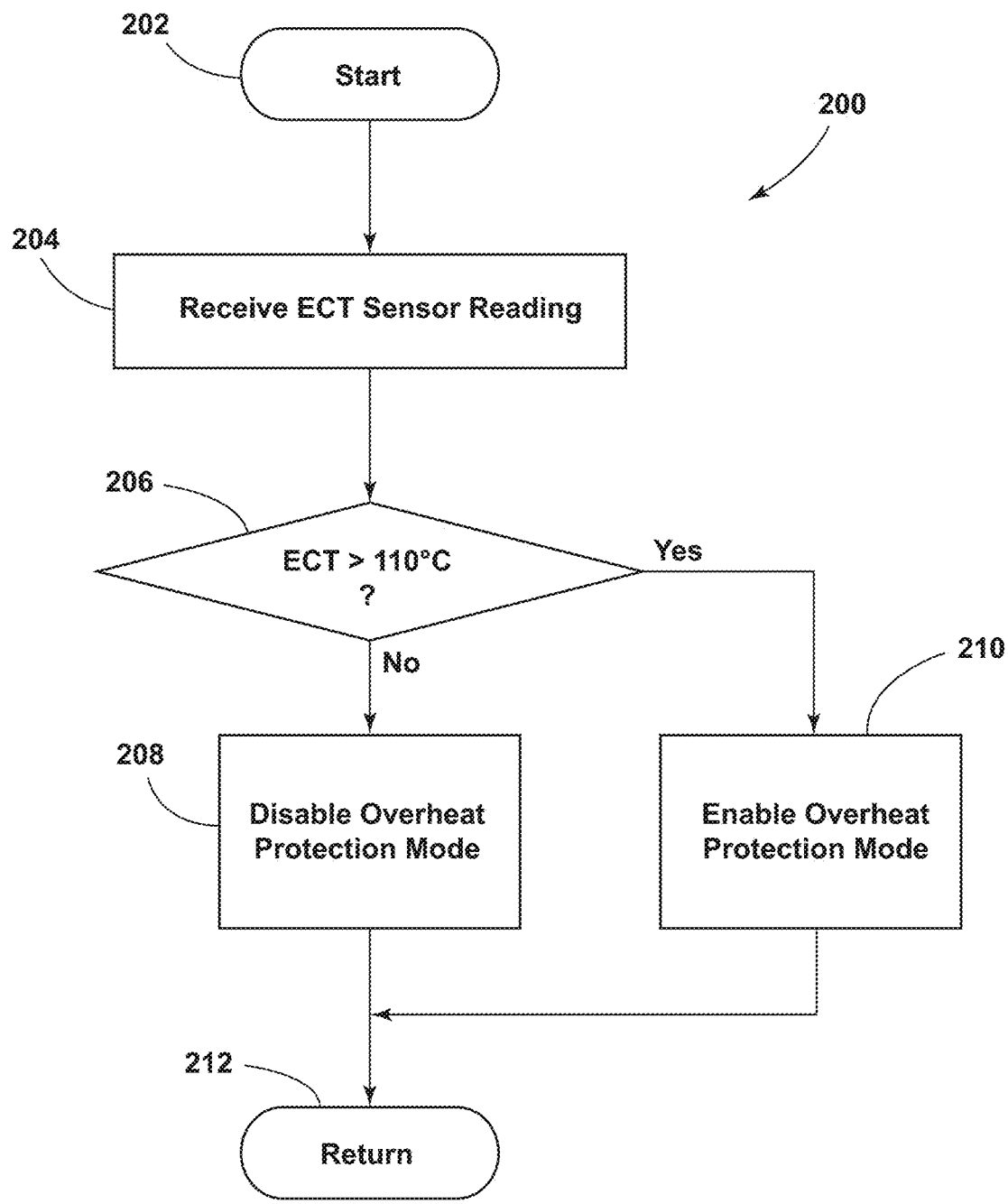
FIG. 2 is a flow diagram for enabling an overheat protection mode based on engine coolant temperature according to one embodiment of the present disclosure.
Figure 3:
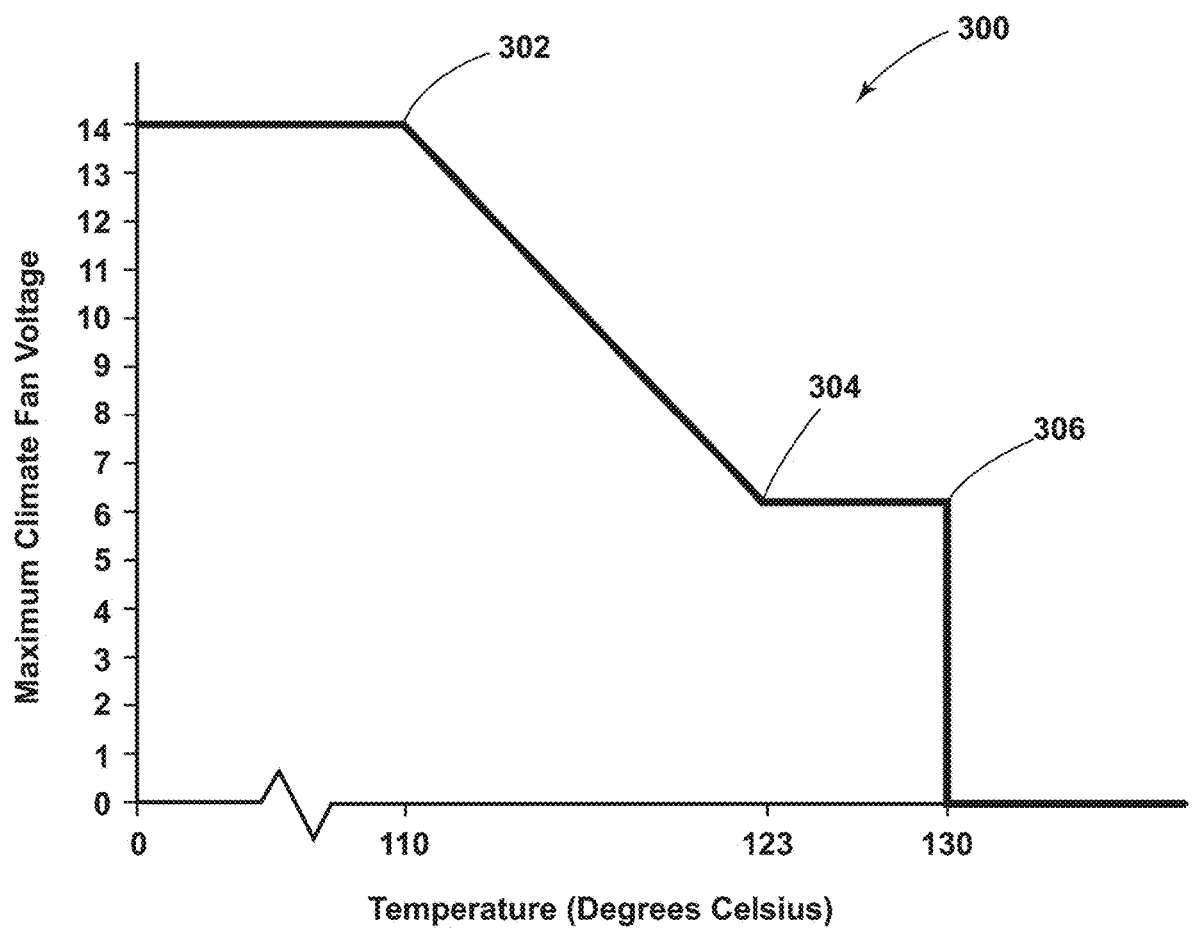
FIG. 3 is a graph of a climate fan control curve according to one embodiment of the present disclosure.

Referring to FIGS. 1-3, a vehicle 10 is provided including a cooling system 14, a heat pump system 28, an HVAC system 38, and a climate control module 48. The climate control module 48 is configured to receive a temperature reading from an engine coolant temperature (ECT) sensor 22 corresponding to the temperature of a coolant (e.g., an ethylene glycol solution) flowing through an engine block of an engine 12. Additionally, the climate control module 48 is configured to control a maximum speed of a climate fan 44 of the HVAC system 38. In response to receiving a temperature reading from The ECT sensor 22 above an overheat temperature 302, the climate control module 48 enables an overheat protection mode. While operating in the overheat protection mode, the climate control module 48, enables a control curve 300 for the maximum speed of the climate fan 44 based on the received temperature reading from the ECT sensor 22 to help prevent overheating of the engine 12.

A plurality of advantages are present by reducing the maximum speed of the climate fan 44. First, a thermal load on the heat pump system 28 is reduced. Accordingly, a temperature of a condenser 32 of the heat pump system 28 is reduced thereby reducing the temperature of ambient air 52 flowing over a radiator 18 of the cooling system 14. Accordingly, the capabilities of the cooling system 14 are increased. Second, by decreasing the thermal load on the heat pump system 28, the speed and/or duty of a compressor 30 of the heat pump system 28 may also be reduced. In some embodiments, the compressor 30 is directly driven by the engine 12 through an electromagnetic clutch. Accordingly, a reduction in the speed and/or duty of the compressor 30 directly affects the overall load on the engine 12. Third, the vehicle 10 typically includes an alternator for maintaining power of an electrical system of the vehicle 10. The alternator is typically driven by the engine 12. By reducing the speed of the climate fan 44, an electrical demand of the climate fan 44 on the alternator is reduced thereby decreasing the overall load on the engine 12. In some embodiments, the compressor 30 is an electric compressor. Accordingly, a reduction in the speed and/or duty cycle of the compressor 30 would affect the overall load on the engine 12 via the alternator.

Referring now to FIG. 1, the vehicle 10 includes one or more powertrain components. The one or more powertrain components may include, but are not limited to, the engine 12, a transmission, one or more drive shafts, one or more differentials, and final drive component (e.g., a wheel or a track). In various embodiments, the engine 12 comprises an electric motor. In embodiments where the engine 12 comprises an electric motor, the powertrain may include powertrain components associated with electric vehicles (e.g., a high-voltage battery, an inverter, and various electrical components). According to some aspects, the engine 12 operates by principles of internal combustion. In examples where the engine 12 is an internal combustion engine, fuel is directed to the engine 12 and combusted to produce power for the operation of the vehicle 10. As the fuel is combusted, a substantial amount of heat is generated. The generated heat has the potential to adversely affect and damage various components of the engine 12 and the vehicle 10. Accordingly, the engine 12 is typically thermally coupled to the cooling system 14.

The cooling system 14 may include a coolant pump 16, a radiator 18, a thermostat 20, a cooling fan assembly 54, and the ECT sensor 22 fluidly coupled with a coolant of the engine 12.

The thermostat 20 comprises a valve for regulating the flow of the coolant through the cooling system 14. The engine 12, when first started, may be at a lower than optimal operating temperature. Accordingly, the thermostat 20 remains closed until the engine 12 reaches an optimal operating temperature. When the engine 12 reaches an optimal operating temperature, the thermostat 20 opens allowing the coolant to flow through the cooling system 14 to maintain the operating temperature of the engine 12 and to prevent overheating of the engine 12.

The coolant is circulated through the cooling system 14 by the coolant pump 16. The coolant pump 16 is typically driven by the engine 12 and may comprise any practical pump (e.g., a centrifugal pump) for circulating coolant through the cooling system 14.

As the coolant is circulated through the cooling system 14, high-temperature coolant 24 is typically directed from the engine to the radiator 18. The radiator 18 typically comprises a liquid-to-air heat exchanger (e.g., a finned-tube heat exchanger) located toward a front portion of the vehicle 10. As the high-temperature coolant 24 flows through the radiator 18, the high-temperature coolant 24 exchanges heat with ambient air 52 to become a low-temperature coolant 26. The low-temperature coolant 26 is then directed back to the engine 12.

The vehicle 10 further includes the heat pump system 28 including the compressor 30, the condenser 32, an expansion device 34, and the evaporator 36.

The compressor 30 circulates a refrigerant through the heat pump system 28. Exemplary refrigerants include, but are not limited to, r134a and r1234yf, however, any practical phase change refrigerant material is contemplated. The compressor 30 includes both a suction port and a discharge port. According to some aspects, the compressor 30 may include additional ports (e.g., a vapor injection port). The refrigerant enters the suction port of the compressor 30 as low-temperature vapor refrigerant, is compressed, and is directed out of the compressor 30 as high-temperature vapor refrigerant.

The high-temperature vapor refrigerant is then directed to the condenser 32. The condenser 32 typically comprises a finned tube heat exchanger located in a front portion of the vehicle 10. As the high-temperature vapor refrigerant passes through the condenser 32, the high-temperature vapor refrigerant exchanges heat with ambient air 52 and condenses to become a high-temperature liquid refrigerant. In some embodiments, the heat exchanged from the refrigerant generally comprises latent heat being exchanged in a generally isothermal process such that the temperature of the refrigerant decreases only a small amount as compared to the increase in temperature of the ambient air 52. The heated ambient air 52 then passes from the condenser 32 through the radiator 18 and the cooling fan assembly 54.

The high-temperature liquid refrigerant is then directed to the expansion device 34 where the refrigerant decreases in pressure and temperature to become a generally low-temperature liquid and vapor mixture. In various embodiments, the expansion device 34 comprises a thermal expansion valve or electronic expansion valve, however, any suitable expansion device 34 is contemplated.

The low-temperature liquid and vapor mixture then enters the evaporator 36. As the mixture flows through the evaporator 36, the mixture exchanges heat with HVAC air. In various embodiments, the HVAC air comprises outside fresh air or recirculated interior air of the passenger compartment. The HVAC air is driven by the climate fan 44 over an exterior surface of the evaporator 36. In this embodiment, the HVAC air is then directed from an HVAC case 40 through one or more ducts 46 to the passenger compartment of the vehicle 10. Heat is thereby transferred from the HVAC air to the refrigerant thereby cooling the interior air of the passenger compartment. The refrigerant, as it exchanges heat with the interior air, evaporates and exits the evaporator 36 as a low-temperature vapor refrigerant. The refrigerant is then returned to the suction port of the compressor 30.

The vehicle 10 further includes an HVAC system 38. The HVAC system 38 typically includes the HVAC case 40, the evaporator 36, a heater 42, the climate fan 44, and the one or more ducts 46 fluidly coupled to the passenger compartment of the vehicle 10.

The HVAC case 40, is typically disposed between an engine compartment and the passenger compartment of the vehicle 10. The HVAC case 40 typically houses the evaporator 36, the heater 42, and the climate fan 44. Fresh outside air or recirculating cabin air is drawn into the HVAC case 40 by the climate fan 44 as HVAC air. Airflow doors situated in the HVAC case 40 then direct the HVAC air over an exterior surface of the heater 42 and/or the exterior surface of the evaporator 36. As the air passes through the heater 42 and/or the evaporator 36, the air is heated, cooled, and/or dehumidified to a desired condition. The conditioned air is then directed through the ducts 46 into the passenger compartment of the vehicle 10. As shown in FIG. 1, the heater 42 comprises a coolant-to-air heat exchanger fluidly coupled to the engine 12. In various embodiments, the heater 42 may comprise an electrical resistance heater or other suitable devices for heating the HVAC air.

The vehicle 10 further includes a climate control module 48 in electrical communication with at least the ECT sensor 22 and the climate fan 44. In various embodiments, climate control module 48 is in electrical communication with the ECT sensor 22 and/or the climate fan 44 via one or more electronic control units (ECUs). The climate control module 48 is configured to receive a climate fan setting 50 associated with a desired fan speed from a user input device (e.g., climate fan control knob). The climate control module 48 then controls the climate fan 44 to run at a desired fan speed associated with the climate fan setting 50. According to some embodiments, the climate control module 48 may reduce the maximum speed of the climate fan 44 in response to a received temperature reading from the ECT sensor 22 exceeding an overheat temperature 302 (FIG. 3). In some aspects, the maximum speed of the climate fan 44 may be reduced such that the climate fan 44 is operated at speed less than the desired fan speed. In some embodiments, the speed of the climate fan 44 is associated with a supplied voltage to the climate fan 44. According to some aspects, a maximum supplied voltage to the climate fan 44 may be associated with a voltage of a battery of the vehicle 10 (e.g., about 14 volts (V)).

The reduced maximum speed of the climate fan 44 may result in decreased temperatures of the condenser 32, a decreased load on the engine 12 from the compressor 30, and a decreased load on the engine 12 from the alternator. As the speed of the climate fan 44 is reduced, the amount of heat transferred from the HVAC air to the refrigerant at the evaporator 36 is decreased. Accordingly, a thermal load on the heat pump system 28 is decreased and the temperature of the condenser 32 is thereby decreased. As the temperature of the condenser 32 is decreased, the temperature of the ambient air 52 entering the radiator 18 is decreased thereby increasing the cooling capacity of the cooling system 14. Accordingly, the cooling system 14 would be better suited to maintain the temperature of the engine 12 within acceptable limits.

In addition to decreased temperatures at the condenser 32, the decreased thermal load on the heat pump system 28 may also result in a decreased demand on the compressor 30. Accordingly, the speed and/or duty cycle of the compressor 30 may be reduced resulting in a decreased load on the engine 12. In some embodiments, the compressor 30 is directly driven by the engine 12. In other embodiments, the compressor 30 is an electric compressor. In embodiments where the compressor 30 is an electric compressor, the decreased speed and/or duty cycle of the compressor 30 may result in a decreased load on the engine 12 via the alternator.

In addition to the benefits associated with a decreased thermal load on the heat pump system 28, the load on the engine 12 may be affected by the decrease in the electrical demand of the climate fan 44 on the alternator. As the speed of the climate fan 44 is reduced, the climate fan 44 draws less power from an electrical system of the vehicle 10. Accordingly, the alternator of the vehicle 10 places a smaller load on the engine 12. For example, in an exemplary embodiment, the climate fan 44 running at 14V may draw an estimated 23 Amps (A) of current resulting in about 322 Watts (W) of power. By reducing the voltage of the climate fan 44 to about 6V, the climate fan 44 would draw an estimated 11 A of current resulting in about 66 W of power. In the exemplary embodiment, the reduction in the speed of the climate fan 44 results in about a 256 W difference in electrical demand on the alternator by the climate fan 44.

Referring now to FIGS. 2 and 3, a method 200 (FIG. 2) for reducing the speed of the climate fan 44 based on the temperature reading of the ECT sensor 22 and an exemplary control curve 300 (FIG. 3) are provided. After initializing method 200 (operation 202), the climate control module 48 receives a temperature reading from the ECT sensor 22 (operation 204). The climate control module 48 may receive the temperature reading directly from the ECT sensor 22 or may receive the temperature reading from the ECT sensor 22 via one or more ECUs. Upon receiving the temperature reading from the ECT sensor 22, the climate control module 48 compares the received temperature reading to the overheat temperature 302 (operation 206). In some embodiments, the overheat temperature 302 is about 100 degrees Celsius to about 120 degrees Celsius (e.g., about 110 degrees Celsius). If the received temperature reading is below the overheat temperature 302, the climate control module 48 disables (or continues to operate without) the overheat protection mode (operation 208). The method 200 then returns (operation 212) to the start (operation 202) of the method 200 to continue to monitor the temperature of the engine 12 via the ECT sensor 22.

If the received temperature reading exceeds the overheat temperature 302 (operation 206), the climate control module 48 enables the overheat protection mode (operation 210). While operating in the overheat protection mode, the climate control module 48 reduces the maximum speed of the climate fan 44. In some embodiments, a control curve 300 (FIG. 3) of the climate fan 44 is implemented where the maximum speed of the climate fan 44 is reduced linearly as a function of the received temperature reading from the ECT sensor 22. As shown, the maximum speed of the climate fan 44 begins to be reduced as the received temperature reading exceeds the overheat temperature 302. In some embodiments, the reduction to the maximum speed of the climate fan 44 remains constant upon reaching an upper-limit temperature 304 such that the maximum speed of the climate fan 44 is not affected by temperatures exceeding the upper-limit temperature 304. In some embodiments, the upper-limit temperature 304 is about 113 degrees Celsius to about 133 degrees Celsius (e.g., about 123 degrees Celsius). In other embodiments, the reduction in the maximum speed of the climate fan 44 may continue to decrease as a function of the received temperature reading beyond the upper-limit temperature 304 until the maximum speed of the climate fan 44 reaches zero. According to some aspects, the control curve 300 may include a cut-off temperature 306 where, upon receiving a temperature reading exceeding the cut-off temperature 306, the climate fan 44 is disabled completely. In some embodiments, the cut-off temperature 306 is about 120 degrees Celsius to about 140 degrees Celsius (e.g., about 130 degrees Celsius). In some embodiments, the climate control module 48 may disable the compressor 30 of the heat pump system 28 upon receiving a temperature reading exceeding the cut-off temperature 306.

An advantage of the current disclosure is that the compressor 30 of the heat pump system 28 may continue to operate when the temperature reading exceeds the overheat temperature 302 (i.e. while the climate control module 48 is operating in the overheat protection mode). This allows the HVAC system 38 to mitigate overheating of the engine 12 while still providing at least some level of comfort to passengers in the vehicle 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle comprising:
   an engine cooling system comprising:
     an engine;
     a radiator fluidly coupled to the engine; and
     a sensor configured to provide a temperature reading of a coolant at the engine;
   a heat pump system comprising:
     a condenser disposed proximate the radiator and fluidly coupled to a compressor; and
     an evaporator fluidly coupled to the condenser;
   a climate fan fluidly coupled to an exterior surface of the evaporator; and
   a climate control module configured to control a speed of the climate fan, wherein the climate control module establishes a maximum speed of the climate fan in response to a temperature reading from the sensor, wherein the maximum speed of the climate fan speed is reduced in response to the temperature reading exceeding an overheat temperature.

2. The vehicle of claim 1, wherein the maximum climate fan speed is reduced linearly, as a function of the temperature reading, as the temperature reading exceeds the overheat temperature.

3. The vehicle of claim 1, wherein the overheat temperature is about 100 degrees Celsius to about 120 degrees Celsius.

4. The vehicle of claim 1, wherein the reduction to the maximum speed of the climate fan is capped in response to the temperature reading exceeding an upper-limit temperature.

5. The vehicle of claim 4, wherein the upper-limit temperature is about 113 degrees Celsius to about 133 degrees Celsius.

6. The vehicle of claim 1, wherein the climate control module disables the climate fan in response to the temperature reading exceeding a cut-off temperature.

7. The vehicle of claim 6, wherein the cut-off temperature is about 120 degrees Celsius to about 140 degrees Celsius.

8. A method for reducing engine coolant temperature comprising:
   providing a vehicle including an engine coolant temperature sensor, a climate control module, and a climate fan;
   receiving, by the climate control module, a temperature reading from the engine coolant temperature sensor by the climate control module; and
   establishing a maximum speed of the climate fan by the climate control module based on the received temperature reading, wherein the maximum speed of the climate fan speed is reduced in response to the temperature reading exceeding an overheat temperature.

9. The method of claim 8, wherein the maximum climate fan speed is reduced linearly, as a function of the received temperature reading, as the temperature reading exceeds the overheat temperature.

10. The method of claim 8, wherein the overheat temperature is about 100 degrees Celsius to about 120 degrees Celsius.

11. The method of claim 9, wherein the reduction to the maximum speed of the climate fan is capped in response to the temperature reading exceeding an upper-limit temperature.

12. The method of claim 11, wherein the upper-limit temperature is about 113 degrees Celsius to about 133 degrees Celsius.

13. The method of claim 9, wherein the climate control module disables the climate fan in response to the temperature reading exceeding a cut-off temperature.

14. The method of claim 13, wherein the cut-off temperature is about 120 degrees Celsius to about 140 degrees Celsius.

15. A vehicle comprising:
   a cooling system comprising a coolant temperature sensor;
   an HVAC system comprising a climate fan; and
   a controller electrically coupled to the coolant temperature sensor and the climate fan, wherein the controller establishes a maximum speed of the climate fan in response to receiving a temperature reading from the coolant temperature sensor, wherein the maximum speed of the climate fan speed is reduced in response to the temperature reading exceeding an overheat temperature.

16. The vehicle of claim 15, further comprising a compressor for circulating a refrigerant through a heat pump system, wherein function of the compressor is maintained when the temperature reading exceeds the overheat temperature.

17. The vehicle of claim 16, wherein the climate fan and the compressor are disabled in response to the temperature reading exceeding a cut-off temperature wherein the cut-off temperature is greater than the overheat temperature.

* * * * *